(12) United States Patent
Bin

(10) Patent No.: US 6,926,779 B1
(45) Date of Patent: Aug. 9, 2005

(54) LEAD-FREE COPPER-BASED COATINGS WITH BISMUTH FOR SWASHPLATE COMPRESSORS

(75) Inventor: Feng Bin, Canton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 09/451,538

(22) Filed: Dec. 1, 1999

(51) Int. Cl.[7] .................................... C22C 9/06
(52) U.S. Cl. ..................... 148/432; 148/435
(58) Field of Search .................. 148/432, 435

(56) References Cited

U.S. PATENT DOCUMENTS

| | | |
|---|---|---|
| 1,654,509 A | 12/1927 | Claus |
| 3,669,719 A | 6/1972 | Doede et al. |
| 3,947,607 A | 3/1976 | Gazzard et al. |
| 3,997,099 A * | 12/1976 | Morisaki ............ 228/117 |
| 4,666,787 A | 5/1987 | Bickle et al. |
| 4,935,056 A | 6/1990 | Miyasaka |
| 5,056,417 A | 10/1991 | Kato et al. |
| 5,087,529 A | 2/1992 | Engel et al. |
| 5,167,726 A | 12/1992 | IoIacono et al. |
| 5,242,657 A | 9/1993 | Sahu |
| 5,286,444 A | 2/1994 | Tomikawa et al. |
| 5,330,712 A | 7/1994 | Singh |
| 5,413,756 A | 5/1995 | Sahu |
| 5,864,745 A | 1/1999 | Kawagoe et al. |
| 5,875,702 A | 3/1999 | Kawagoe et al. |
| 5,938,864 A | 8/1999 | Tomikawa et al. |

FOREIGN PATENT DOCUMENTS

| | | | |
|---|---|---|---|
| CN | 1224768 | * | 8/1999 |
| EP | 0224619 | | 6/1987 |
| EP | 0713972 | | 5/1996 |
| EP | 0776986 | | 6/1997 |
| EP | 0926340 | | 6/1999 |
| JP | 59154721 | * | 9/1984 |
| JP | 60022080 | | 2/1985 |
| JP | 08283889 | * | 10/1996 |
| JP | 09316970 | * | 12/1997 |

* cited by examiner

*Primary Examiner*—Sikyin Ip
(74) *Attorney, Agent, or Firm*—Brinks Hofer Gilson & Lione

(57) ABSTRACT

A surface of aluminum alloy or iron alloy coated, on at least a part, with a lead-free copper-based coating layer comprising, by weight, 0.2–15% bismuth, and at least one metal selected from the group consisting of 5–40% nickel, 1–20% chromium, 1–20% iron, and 1–10% cobalt, the balance being copper which is more than 55%. The surface may be of a swashplate used in swashplate type compressors.

2 Claims, 2 Drawing Sheets

LEAD-FREE COPPER-BASED COATINGS WITH BISMUTH FOR SWASHPLATE COMPRESSORS

FIELD OF THE INVENTION

The present invention relates to alloy coatings useful to provide anti-seizure and wear capabilities to surfaces. The mostly-copper alloy coatings are lead-free and include bismuth and at least one of nickel, chromium and iron. These copper-based alloys are particularly useful as coatings on swashplates used in swashplate type compressors for compressing a refrigerant gas, by rotating a swashplate. The swashplate body is an aluminum alloy or iron alloy.

BACKGROUND OF THE INVENTION

Conventionally, a swashplate type compressor is used in systems such as an air conditioning system of an automobile. According to a known swashplate type compressor, the transmission of motive power is carried out, as a swashplate rotates and a piston reciprocates, thereby suctioning, compressing and discharging the gas. The swashplate is usually composed of aluminum or iron alloy. The shoes, which make slideable contact with the swashplate when it rotates, are composed of iron or copper alloys. The metal on metal contact at the shoe and swashplate interface requires special precautions to be taken in order to prevent undue wear and possible seizure of the shoe with the swashplate. A good countermeasure to this problem has been to apply lubricious coatings on swashplates.

Polymer based coatings have been suggested for coating aluminum swashplates. U.S. Pat. No. 5,655,432 treats a swashplate with a coating of a mixture of cross-linked polyfluoro-elastomer bonded directly to the aluminum, a lubricious additive and a load bearing additive like boron carbide. The part is masked to apply the coating in only certain areas. Sho 58-129646 discloses a swashplate coated with a solid lubricant such as boron nitride, fluorine resin solidified with resin. It also discloses coating with soft metals like tin and lead. Polymer based coating, while providing excellent friction reduction and seizure resistance at dry condition, have less than desirable wear resistance (durability) due to the physical characteristics of the polymers. That is, they are soft compared to the counterparts they contact, normally ferrous metals, and become even softer at higher temperatures.

Metal coatings are commonly used to treat swashplate surfaces. For example, U.S. Pat. No. 5,056,417 treats a swashplate body with a surface coating layer made of tin and at least one metal selected from the group consisting of copper, nickel, zinc, lead and indium. U.S. Pat. No. 5,864,745 discloses flame sprayed copper based materials which may include lead useful to coat swashplates. Bronzes with lead have high load carrying capability and anti-seizure resistance making them suitable for anti-wear applications. Eliminating lead from coating materials, however, has been the focus of research in many industries due to environmental and health awareness. I have now surprisingly found a new lead-free copper-based coating material which has outstanding wear properties and overcomes deficiencies of prior art coatings.

SUMMARY OF THE INVENTION

The invention is an alloy coated on a surface composed of an aluminum based or iron based alloy. The surface may be that of a swashplate used in a swashplate type compressor. The coating is a lead-free copper-based alloy comprising, by weight, 0.2–15% bismuth, and at least one metal selected from the group consisting of 5–40% nickel, 1–20% chromium, 1–20% iron and 1–10% cobalt, the balance being copper which is at least 55%, more preferably the copper comprises 62–74% of the coating. Desirably, the coating may additionally comprise one or more materials selected from the group consisting of 0.2–5% graphite, 0.2–5% molybdenum disulfide ($MoS_2$), 0.5–8% polytetrafluoroethylene (PTFE), and 0.5–8% indium.

The iron alloy or aluminum alloy surface may be that of a swashplate of a swashplate type compressor or other surface which would benefit from improved wear and lubricity. Such swashplate compressors generally comprises a cylinder block having a cylinder bore disposed parallel to the axis of the cylinder block. A rotary shaft is rotatably mounted within the cylinder block and a swashplate is connected to the rotary shaft for rotation with the rotary shaft within the cylinder block. A piston is reciprocally fitted in the cylinder bore. Shoes slideably intervene between the piston and the swashplate.

Advantageously, the copper-based coating provides a surface which has excellent wear resistance and extremely high anti-seizure resistance. Optimally, this is provided by a coating which is lead-free.

DETAILED DESCRIPTION OF THE PREFERRED EMBODIMENTS

Figure 1:
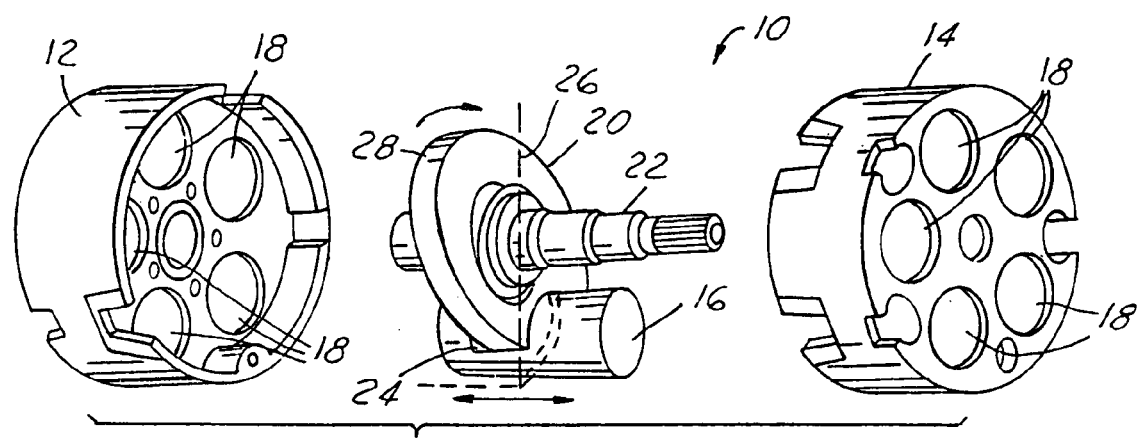
FIG. 1 is an exploded view of a swashplate compressor according to an embodiment of the present invention.

The present invention surface coating layer may be applied on any aluminum based or iron based alloy surface. The surface may be a swashplate 20 surface or the surface of any other article which would benefit from improved wear resistance and anti seizure capability, such as on a bushing. For illustration of one use of the invention coating, it will be illustrated in detail as a coating on a compressor swashplate surface. The compressor can be a fixed capacity one or a variable displacement one that has only one cylinder block and single sided pistons. Illustrated in FIG. 1 is a perspective and exploded view of an automotive swashplate type compressor 10 for propelling refrigerant gas through a cooling circuit. The compressor 10 comprises a two-piece cylinder block 12, 14 which is provided with a plurality of reciprocating pistons 16. For clarity, FIG. 1 depicts only one of such reciprocating piston 16. In practice, each piston 16 reciprocates within cylinder bore 18.

Each piston 16 is in communication with the swashplate 20 which is fixably mounted on an axially extending rotateable shaft 22. The reciprocating motion of each piston 16 within its associated cylinder bore successively siphons, compresses, and discharges refrigerant gas. A pair of pivoting shoes 24 are positioned between each piston 16 and swashplate 20. The shoe 24 transfers the rotational motion of the swashplate 20 to the linear motion of the piston 16. The swashplate 20 has two facial surfaces 26 (only one shown for clarity) which contact the shoe 24.

Rotation of the shaft 22 causes the swashplate 20 to rotate between the cylinder blocks 12, and 14. The facial surfaces 26 contact the shoes 24 and are subjected to a shear-type frictional contact with shoe 24. An end surface 28 may contact the piston 16 if the piston 16 is slightly skewed or bent. As discussed above, the facial surfaces 26 and generally also end surface 28 and are provided with a coating to prevent wear of the swashplate surfaces which may result from contact with piston 16 and shoes 24. As would be appreciated, this coating should also have a low coefficient of friction to increase the efficiency of the compressor. The shape of swashplate 20 according to the present invention may be the same as those of the conventional swashplates. The material composing the matrix of swashplate body 20 is an aluminum alloy or an iron alloy. The aluminum alloy can be, for example, aluminum-high-silicon type alloy or aluminum-silicon magnesium type alloy. The iron alloy can be, for example, AISI 4130 or cast iron.

Figure 2:
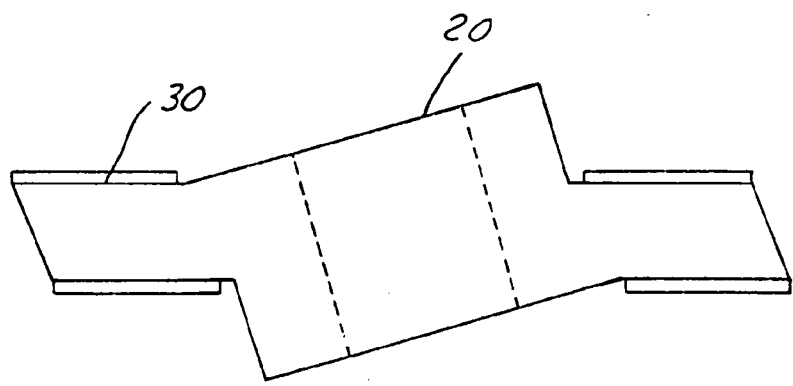
FIG. 2 is a schematic of a swashplate surface with an embodiment of the coating of the present invention.

If not for a coating layer on the swashplate, the swashplate body directly contacts shoes 24. However, according to the present invention, during operation a surface coating layer 30 is present on swashplate body 20 and it contacts shoes 24 so that the chance for seizure under low or no lubrication is greatly reduced. According to the present invention, the surface coating layer 30 in FIG. 2 is formed on the surface of swashplate body 20 at least on the part of the surface having slideable contact with shoes 24. As would be appreciated in view of this disclosure, all or part of a surface may be coated. In the case of the swashplate, the coating would be applied generally at least on the swashplate surface which during operation of the compressor contacts the shoe. Using the present invention coating on the swashplate, the friction between swashplate 20 and shoe 24 is small so that the smooth sliding of shoe 24 on the swashplate 20 is ensured. The surface coating layer 30 is superior in strength thereby reducing the amount of abrasion which occurs thereon.

The invention alloy coating is a lead-free copper-based coating which comprises, by weight, 0.2–15% bismuth, and at least one metal selected from the group consisting of 5–40% nickel, 1–20% chromium, 1–20% iron and 1–10% cobalt, the balance being copper which is at least 55%. The coating may additionally comprise one or more optional materials selected from the group consisting of 0.2–5% graphite, 0.2–5% molybdenum disulfide ($MoS_2$), 0.5–8% polytetrafluoroethylene (PTFE), and 0.5–8% indium.

In the preferred embodiments of the copper-based invention coating, the coating comprises: 0.5–6% bismuth, 15–30% nickel, 1–5% chromium, 1–5% iron, 0.5–4% graphite, 0.5–4% molybdenum disulfide, 1–5% PTFE, and 1–5% indium. In the preferred coating, the copper optimally comprises 62 to 74 wt. %. The graphite, $MoS_2$, PTFE and indium are useful to further reduce friction and enhance anti-seizure properties of the coating. The PTFE used in the present invention is a material well known in the art.

Another significant aspect of the present invention composition is that the amount of bismuth can be varied as detailed above to provide the optimal properties desired for the particular application. That is, since bismuth can improve lubricity, more bismuth may be desired in the coating composition. However, if the coating is applied by thermal spraying, bismuth can be burnt off during the coating process, which can undesirably contribute to porosity in the coating microstructure. For a specific application, a balance is reached between the lubricity, mechanical strength and integrity of the coating based on the amount of added bismuth. Selection of the optimal amount within those defined herein would be apparent to one skilled in the art in view of the present disclosure.

According to one process for forming the coating, the elements in the desired coating are mixed and fabricated to the form of powder or wire. Then this material may be applied to the component surface by various thermal spraying coating processes or by powder metallurgy. In a preferred swashplate application, thermal spray methods are used which include electric wire arc, plasma and high velocity oxygen fuel (HVOF) processes. Post coating heat treatment can be performed to relieve thermal residual stress within the coating and to improve interface bonding.

In wire arc spray process, the feed material is in the form of wire which can be solid alloy wire or cord wire. Cord wire is formed by wrapping powder in the center with a metal sheet/foil. During the spraying, the high temperature generated by the electric arc melts the wire tip and molten metallic particles are produced by air jet passing through the channel. Then they are propelled to the target and impinge on the surface to form a coating layer. It should be noted that in this spraying process, the coating composition is different from the composition of the feed material because the initial material has to go through melting, oxidation, rapid solidification and diffusion processes. Using cord wire was found to produce a less homogeneous microstructure comparing to other thermal spray methods due to the inhomogeneity of the initial feed wire. And, at high electric arc temperatures, bismuth content in the coated layer is reduced from the initial material composition since bismuth, having a much lower melting point compared with copper and nickel, is subject to being burnt off.

HVOF and plasma spray processes, in contrast, use powder as feed material. The powder particles travel at higher velocity and the application temperature is lower compared to that encountered in the wire arc spray process. As a result, the coating quality and bond strength from these processes are much higher than that from wire arc spray. The porosity level from HVOF can be as low as less than 1% while wire arc generally produces higher than 4% porosity. However, the cost of HVOF or plasma process is much higher which may make it less commercially desirable. Hence, a balance of these considerations will be taken into account when choosing the application method.

As pointed out above, the unique physical and chemical characteristics of each coating method can result in coatings having different microstructures. For example, in wire arc spraying, generally big molten droplets are produced which will impinge on the target surface. HVOF and plasma techniques generally use a powder of well defined particle size range and the particles during application can form molten or semi-molten particles. The microstructure of the coatings produced by these latter application methods generally are more uniform on a micro-scale than those produced by the wire arc process. The specific micro-distribution of chemicals at any point of the coating, the morphology and size of a microstructural phase and the porosity level are thus dependent on the particular process and the process parameters. The thermal spray method was preferably used to apply the new coating materials to the swashplates in this study because of its simplicity, easy set-up, controllability of the microstructure, little disturbance to the substrate and high coating deposition efficiency. It is also a preferred process for manufacturing. Still other application techniques will be apparent to those skilled in the art in view of the present disclosure.

The adhesion of the alloy coating of the present invention to the iron or aluminum base alloys can be improved by adding an intermediate bond coat, when desired, between the substrate and the coating described above. This will increase the durability of the coating in service and the machinability during the surface finishing operation. However, cost increase is always associated with the introduction of an interface bond coat. The bond coating may be made, e.g., of nickel-aluminum and copper-aluminum alloys. Still other bond coating materials will be apparent to those skilled in the art in view of the present disclosure and many of them can be found in the literatures related to thermal spray industry.

In the present invention, the coating may be applied in a thickness of about 200 to 500 µm. After surface finishing such a thickness is often reduced to 75 to 350 µm, more preferably being 100 to 250 µm. In case a thicker coating is needed, the spraying step or the pass of the spray gun over the target surface can be repeated several times. After the material is coated on to the iron alloy or aluminum alloy surface, it can be heat treated to decrease element segregation in the microstructure. If desired, the surface to be coated may be treated by sand blasting, chemical etching or other methods prior to providing the coating. This pre-treatment desirably provides a surface roughness level from Ra 4 micron to 20 micron which can aid in improving the bond strength of the coating to the surface due to the interlocking mechanism between the surface crater edges and the coating material.

The lead-free copper based coatings disclosed herein were found to provide excellent wear and lubricity characteristics. Consequently, a swashplate compressor according to the present invention can satisfactory withstand very severe use and achieve long service life. It was unexpectedly found by the inventor that the present invention copper-based coating, e.g., copper, nickel, and bismuth, can be used to replace bronzes containing lead used on compressor swashplates and similar applications. Unexpectedly, the newly invented alloys have much better anti-seizure resistance than the traditional lead bronzes and similar load carrying capabilities when tested under the same conditions, as described in detail in the examples. It is believed that these excellent tribological properties of the invention alloys, without the use of lead, result from the unique properties of bismuth and its metallurgical interactions with copper and other metals of the coating like nickel, for example. The high anti seizure performance and wear resistance are believed to be achieved by the formation of specific microstructures in the coating development. For example, according to one embodiment of the invention coating, when combining copper, nickel, and bismuth together, the newly invented coating has unique microstructure. Copper and nickel are mutually soluble and can form a perfect solid solution in any proportions. This feature provides a desirable structure in which copper and nickel rich phases appear to be arranged alternately. Each phase has different hardness levels due to the difference in copper to nickel ratios. The hard nickel rich phase provides excellent wear resistance for the coating. The phases containing substantial bismuth or pure bismuth phase are relatively soft and non-sticky to steel surface yet durable to provide lubricity under harsh conditions. Thus the invention coatings which contain bismuth have excellent anti seizure resistance. However, neither the truth nor understanding of the theory provided above is necessary for the practice of the present invention. This theory is advanced in an attempt to explain the excellent results obtained with the present lead-free invention coating.

EXAMPLE 1

A coating formulation according to one embodiment of the present invention was made from wire having a composition of 67% Cu, 26% Ni, 5.4% Bi and 1.6% graphite. A twin wire electric arc thermal spray system, TAFA 8835 from TAFA Inc. was used to coat steel test disks to a thickness of approximately 0.4 mm. Then the final thickness was reduced to 0.25 mm after grinding. The coating process was carried out in an ambient atmosphere. The applied coating chemical composition varied slightly from that of the wire, and the coating did not have a uniform elemental distribution within the coating layer on a micro-scale. At one evaluated area, this sample #1 coating composition had copper, nickel, and bismuth in the following weight amounts, respectively: 74%, 22%, and 2.1%. At another area of the coating, the composition was 70.8% Cu, 24.5% Ni, 0.5% Bi and 4.2%O. It is clear from these evaluations that oxygen was picked up from the ambient environment during the thermal spray process. Although it is common to see oxides in thermal spray coatings, the content needs to be controlled to get a desirable performance. The bismuth in the coating has two forms: (1) a bismuth rich phase and (2) scattered in the copper-nickel solid solution. Both bismuth forms improve the anti-seizure resistance of the coating material by providing self-lubricity. This micro-variation in the coating composition does not have a significant impact on the tribological properties of the coating since it had excellent wear properties.

EXAMPLE 2

Another coating material according to another embodiment of the present invention was made in the powder form. High velocity oxygen fuel (HVOF) was used to apply a powder whose composition was 65% Cu, 30% Ni and 5% Bi (coating sample #2). Plasma could alternately be used to apply the coating from the powder. The coating was applied to steel test disks to a thickness of 0.35 mm. This is slightly thinner than that produced in Example 1 by the wire arc spray process. Then, the coating was polished to a thickness of 0.25 mm.

Figure 3:
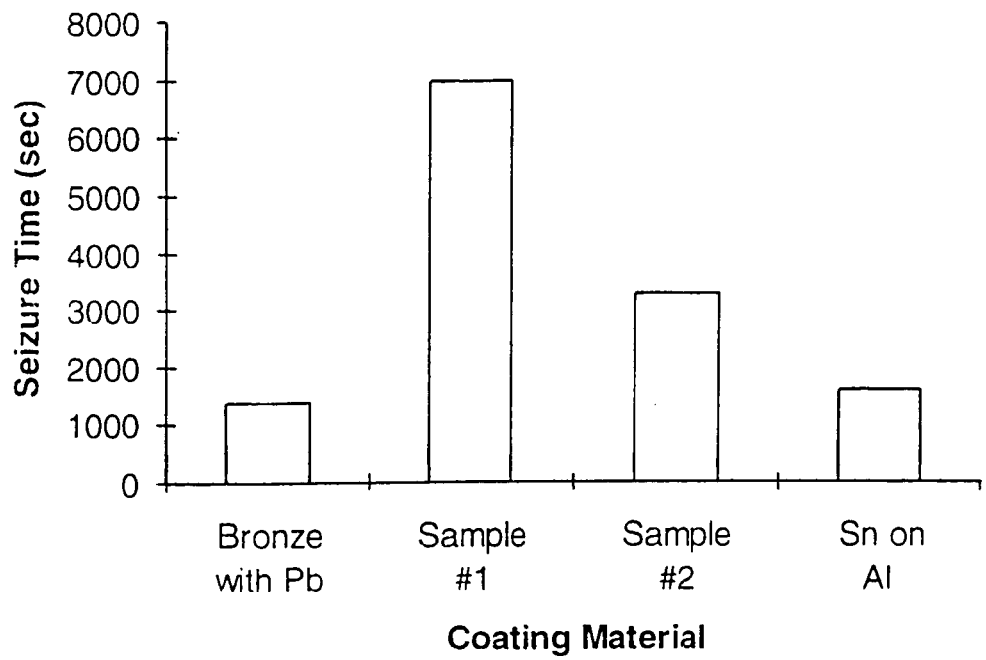
FIG. 3. Graph showing marginal lubrication test results of comparative and invention embodiment materials.
Figure 4:
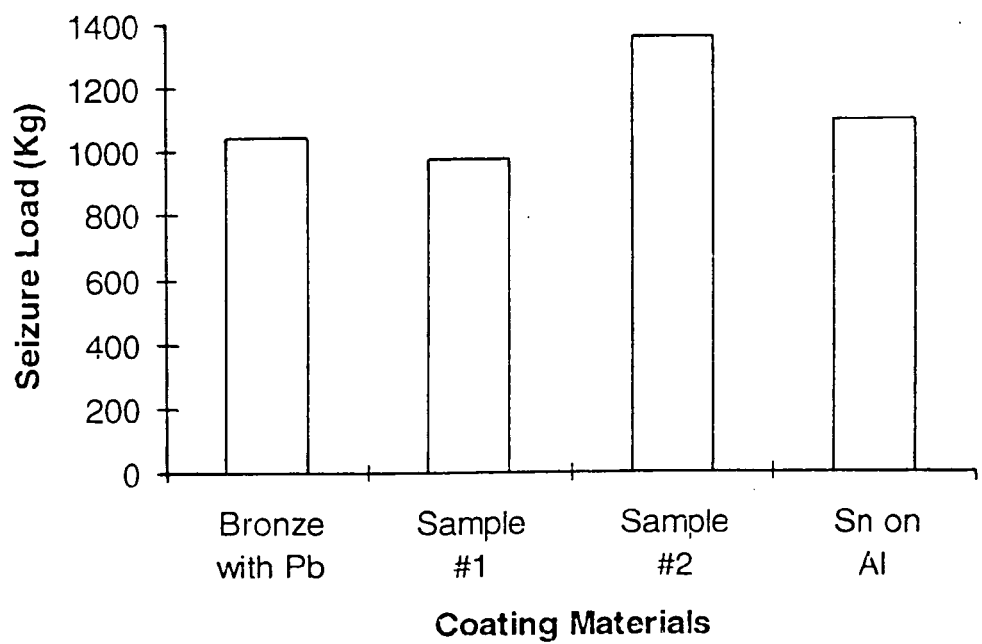
FIG. 4. Graph showing load carrying capability test under lubricated condition of FIG. 3 coating materials.

The performance test results of the Example 1 and Example 2 coatings are shown in FIGS. 3 and 4 in average values. Swashplate coating performance is given for the marginal lubrication bench test (seizure time in sec.) and the load carrying capability test (seizure load in kg). The results from the marginal lubrication test in FIG. 3 show that anti-seizure resistance was increased substantially by adding bismuth into copper-nickel alloys. Actually the seizure time for the example newly invented coatings was several times of that of conventional copper-lead-tin coatings. FIG. 4 shows that the load carrying capability of the lead bronze and the new coatings (seizure loads) are similar to each other under a lubricated condition. It also can be seen from FIGS. 3 and 4 that as the nickel amount is increased in the coating, the loading carrying capability became higher, but anti-seizure resistance was sacrificed. So, by tailoring the ratio of nickel and bismuth, a specific performance target can be achieved which is optimal for its particular application.

As shown in the following table, the coating hardness can vary between different micro-locations on a coating, depending on the exact chemical composition of the coating at that location. For one coating example, the variation in hardness across the coating is shown in Table 1.

TABLE 1

| Hardness values of various coating phases | | | |
|---|---|---|---|
| Area | Ni rich | Cu rich | Bi rich |
| Hardness (Hv) | 174 | 123 | 91 |

It will be obvious to those of skill in the art that various modifications may be made to the foregoing invention without departing from the spirit and scope of the claims that follow.

I claim:

1. An aluminum based or iron based alloy surface coated, on at least a part, with a lead-free copper-based coating layer having a composition comprising, by weight, 0.2–15% bismuth, 1–10% cobalt and 3–8% polytetrafluoroethylene (PTFE), at least one material from the group consisting of 0.2–5% graphite, 0.2–5% molybdenum disulfide (MoS2), and 0.5–8% indium, and the balance being copper which is more than 55%.

2. An aluminum based or iron based alloy surface coated, on at least a part, with a lead-free copper-based coating layer comprising, by weight 0.2–15% bismuth, 1–10% cobalt 0.5–8% Indium and at least one material from the group consisting of 0.2–5% graphite, 0.2–5% molybdenum disulfide (MoS2), and 0.5–8% polytetrafluoroethylene (PTFE), the balance of said coating being copper which is more than 55%.

* * * * *

UNITED STATES PATENT AND TRADEMARK OFFICE
CERTIFICATE OF CORRECTION

PATENT NO. : 6,926,779 B1  Page 1 of 1
DATED : August 9, 2005
INVENTOR(S) : Feng Bin It is certified that error appears in the above-identified patent and that said Letters Patent is hereby corrected as shown below:

Column 8,
Line 8, insert -- , -- after "1-10% cobalt".
Line 9, before "and at least" delete "Indium" and insert -- indium --.

Signed and Sealed this

Eleventh Day of April, 2006

JON W. DUDAS
*Director of the United States Patent and Trademark Office*